United States Patent
Jagannathan et al.

(10) Patent No.: US 10,325,204 B2
(45) Date of Patent: Jun. 18, 2019

(54) EFFICIENT DECISION TREE TRAVERSAL IN AN ADAPTIVE BOOSTING (ADABOOST) CLASSIFIER

(71) Applicant: Texas Instruments Incorporated, Dallas, TX (US)

(72) Inventors: Shyam Jagannathan, Bangalore (IN); Pramod Kumar Swami, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 975 days.

(21) Appl. No.: 14/792,596

(22) Filed: Jul. 6, 2015

(65) Prior Publication Data

US 2017/0011294 A1 Jan. 12, 2017

(51) Int. Cl.
- G06F 9/38 (2018.01)
- G06N 5/02 (2006.01)
- G06K 9/00 (2006.01)
- G06K 9/62 (2006.01)

(52) U.S. Cl.
CPC ............ G06N 5/02 (2013.01); G06F 9/3887 (2013.01); G06K 9/00973 (2013.01); G06K 9/6257 (2013.01)

(58) Field of Classification Search
CPC combination set(s) only.
See application file for complete search history.

(56) References Cited

U.S. PATENT DOCUMENTS

| 5,805,915 A | 9/1998 | Wilkinson et al. |
|---|---|---|
| 8,533,129 B2 | 9/2013 | Kejariwal et al. |
| 8,923,585 B1 | 12/2014 | Peieg |
| 2015/0036942 A1* | 2/2015 | Smirnov ............. G06K 9/6282 382/227 |
| 2015/0058579 A1* | 2/2015 | Xu ..................... G06K 9/00973 711/141 |

OTHER PUBLICATIONS

Indranil Palit, et al., "Parallelized Boosting with Map-Reduce", Data Mining Workshops (ICDMW), 2010 IEEE International Conference On, IEEE, Piscataway, NJ, USA, Dec. 13, 2010, pp. 1346-1353, XP031653762, ISBN: 978-1-4244-9244-2.

(Continued)

Primary Examiner — Reema Patel
Assistant Examiner — Steven M Christopher
(74) Attorney, Agent, or Firm — Michelle F. Murray; Charles A. Brill; Frank D. Cimino

(57) ABSTRACT

A method for object classification in a decision tree based adaptive boosting (AdaBoost) classifier implemented on a single-instruction multiple-data (SIMD) processor is provided that includes receiving feature vectors extracted from N consecutive window positions in an image in a memory coupled to the SIMD processor and evaluating the N consecutive window positions concurrently by the AdaBoost classifier using the feature vectors and vector instructions of the SIMD processor, in which the AdaBoost classifier concurrently traverses decision trees for the N consecutive window positions until classification is complete for the N consecutive window positions.

20 Claims, 14 Drawing Sheets

(56) References Cited

OTHER PUBLICATIONS

Paul Viola, et al., "Robust Real-Time Face Detection", International Journal of Computer VI, Dordrecht, NL, vol. 57, No. 2, Jan. 1, 2004, pp. 137-154, XP008035702, DOI: 10.1023/B:VISI.0000013087. 49260.FB.

Tom Wilson, et al., "Pedestrian Detection Implemented on a Fixed-Point Parallel Architecture", Consumer Electronics, 2009, ISCE '09, IEEE 13th International Symposium On, IEEE, Piscataway, NJ, USA, May 25, 2009, pp. 47-51, XP031484552, ISBN: 978-1-4244-2975-2.

Ryusuke Miyamoto, et al., "Parallel Implementation Strategy for CoHOG-Based Pedestrian Detection Using a Multi-Core Processor", IEICE Transactions on Fundamentals of Electronics, Communications and Computer Sciences, Engineering Sciences Society, Tokyo, JP, vol. E94A, No. 11, Nov. 1, 2011, pp. 2315-2322, XP001572109, ISSN: 0916-8508, DOI: 10.1587/Transfun.E94.A. 2315 [retrieved on Nov. 1, 2011].

Navneet Dalal and Bill Triggs, "Histograms of Oriented Gradients for Human Detection", IEEE Computer Society Conference on Computer Vision and Pattern Recognition, vol. 1, Jun. 20-25, 2005, San Diego, CA, pp. 886-893, vol. 1.

Piotr Dollar, et al, "Integral Channel Features", Proceedings British Machine Vision Conference, vol. 2, No. 3, 2009, pp. 1-11.

Yoav Freund and Robert E. Schapire, "A Decision-Theoretic Generalization of On-Line Learning and an Application to Boosting", Journal of Computer and System Sciences, vol. 55, Issue 1, Aug. 1997, pp. 119-139.

Rodrigo Benenson et al, "Seeking the Strongest Rigid Detector", IEEE Conference on Computer Vision and Pattern Recognition, Jun. 23-28, 2013, Portland, Oregon, pp. 3666-3673.

Paul Viola and Michael Jones, "Rapid Object Detection using a Boosted Cascade of Simple Features", Proceedings of the 2001 IEEE Computer Society Conference on Computer Vision and Pattern Recognition, vol. 1, 2001, pp. I-511-I-518.

"TMS320C66x DSP CPU and Instruction Set", Reference Guide, Texas Instruments, Literature No. SPRUGH7, Nov. 2010, pp. 1-1013.

Paul Viola and Michael J. Jones, "Robust Real-Time Face Detection", International Journal of Computer Vision, vol. 57, Issue 2, 2004, pp. 137-154.

Dr. Edgar Seemann, "Computer Vision: Histograms of Oriented Gradients", Presentation, Computer Vision for Human-Computer Interaction Research Group, University of Karlsruhe, Karlsruhe, Baden-Wurttemberg, Germany, Apr. 12, 2011, pp. 1-29.

* cited by examiner

|             | TREE 1 | TREE 2 | TREE 3 |     | TREE M |
|-------------|--------|--------|--------|-----|--------|
| THRESHOLD 1 | T1     | T1     | T1     | ∘ ∘ ∘ | T1   |
| THRESHOLD 2 | T2     | T2     | T2     | ∘ ∘ ∘ | T2   |
| THRESHOLD 3 | T3     | T3     | T3     | ∘ ∘ ∘ | T3   |
| OFFSET 1    | O1     | O1     | O1     | ∘ ∘ ∘ | O1   |
| OFFSET 2    | O2     | O2     | O2     | ∘ ∘ ∘ | O2   |
| OFFSET 3    | O3     | O3     | O3     | ∘ ∘ ∘ | O3   |
| LEAF 1      | L1     | L1     | L1     | ∘ ∘ ∘ | L1   |
| LEAF 2      | L2     | L2     | L2     | ∘ ∘ ∘ | L2   |
| LEAF 3      | L3     | L3     | L3     | ∘ ∘ ∘ | L3   |
| LEAF 4      | L4     | L4     | L4     | ∘ ∘ ∘ | L4   |

FIG. 10

|  | POS 1 | POS 2 | POS 3 | POS 4 | POS 5 |  |  |  | POS 32 |
|---|---|---|---|---|---|---|---|---|---|
|  | F11 | F12 | F13 | F14 | F15 | ○ | ○ | ○ | F132 |
|  | T1 | T1 | T1 | T1 | T1 | ○ | ○ | ○ | T1 |
|  | F21 | F22 | F23 | F24 | F25 | ○ | ○ | ○ | F232 |
|  | T2 | T2 | T2 | T2 | T2 | ○ | ○ | ○ | T2 |
|  | F31 | F32 | F33 | F34 | F35 | ○ | ○ | ○ | F332 |
|  | T3 | T3 | T3 | T3 | T3 | ○ | ○ | ○ | T3 |

FIG. 13

|  | POS 1 | POS 2 | POS 3 | POS 4 | POS 5 |  |  |  | POS 32 |
|---|---|---|---|---|---|---|---|---|---|
| M1 | M11 | M12 | M13 | M14 | M15 | ○ | ○ | ○ | M132 |
| M2 | M21 | M22 | M23 | M24 | M25 | ○ | ○ | ○ | M232 |
| M3 | M31 | M32 | M33 | M34 | M35 | ○ | ○ | ○ | M332 |

FIG. 14

| M1 | & | M2 | = | K1 | ⇒ | LV1 |
|---|---|---|---|---|---|---|
| M1 | & | ~M2 | = | K2 | ⇒ | LV2 |
| ~M1 | & | M3 | = | K3 | ⇒ | LV3 |
| ~M1 | & | ~M3 | = | K4 | ⇒ | LV4 |

FIG. 15

|     | POS 1 | POS 2 | POS 3 | POS 4 | POS 5 |     | POS 32 |
|-----|-------|-------|-------|-------|-------|-----|--------|
| LV1 | L1    | L1    | L1    | L1    | L1    | ○○○ | L1     |
|     |       |       |   &   |       |       |     |        |
| K1  | K11   | K12   | K13   | K14   | K15   | ○○○ | K132   |
| LV2 | L2    | L2    | L2    | L2    | L2    | ○○○ | L2     |
|     |       |       |   &   |       |       |     |        |
| K2  | K21   | K22   | K23   | K24   | K25   | ○○○ | K232   |
| LV3 | L3    | L3    | L3    | L3    | L3    | ○○○ | L3     |
|     |       |       |   &   |       |       |     |        |
| K3  | K31   | K32   | K33   | K34   | K35   | ○○○ | K332   |
| LV4 | L4    | L4    | L4    | L4    | L4    | ○○○ | L4     |
|     |       |       |   &   |       |       |     |        |
| K4  | K41   | K42   | K43   | K44   | K45   | ○○○ | K432   |

US 10,325,204 B2

EFFICIENT DECISION TREE TRAVERSAL IN AN ADAPTIVE BOOSTING (ADABOOST) CLASSIFIER

BACKGROUND OF THE DISCLOSURE

Field of the Disclosure

Embodiments of the present disclosure generally relate to adaptive boosting (AdaBoost) classification, and more specifically relate to efficient decision tree traversals in an AdaBoost classifier.

Description of the Related Art

AdaBoost, short for "Adaptive Boosting", is an algorithm for constructing a strong classifier as a linear combination of weak classifiers such as decision trees. In an AdaBoost classifier, the output of the weak classifiers is combined into a weighted sum that represents the final output of the boosted classifier. AdaBoost is adaptive in the sense that subsequent weak learners are tweaked in favor of those instances misclassified by previous classifiers. AdaBoost in which decision trees are used as the weak learners is often referred to as the best out-of-the-box classifier and is a popular classifier for vision and data analytics. A detailed description of AdaBoost may be found, for example, in Y. Fruend and R. Schapire, "A Decision-Theoretic Generalization of On-line Learning and an Application to Boosting," Journal of Computer and System Sciences, Vol. 55, Issue 1, August 1997, pp. 119-139.

SUMMARY

Embodiments of the present disclosure relate to methods, apparatus, and computer readable media for efficient decision tree traversals in an AdaBoost classifier. In one aspect, a method for object classification in a decision tree based adaptive boosting (AdaBoost) classifier implemented on a single-instruction multiple-data (SIMD) processor is provided that includes receiving feature vectors extracted from N consecutive window positions in an image in a memory coupled to the SIMD processor, in which N is a vector width of the SIMD processor divided by a bit size of a feature, and in which a feature vector includes N feature values, one feature value for each of the N consecutive window positions, and evaluating the N consecutive window positions concurrently by the AdaBoost classifier using the feature vectors and vector instructions of the SIMD processor, in which the AdaBoost classifier concurrently traverses decision trees for the N consecutive window positions until classification is complete for the N consecutive window positions, in which a decision tree includes a plurality of nodes, a threshold value for each node, and a plurality of leaves, each leaf including a partial score.

In one aspect, a digital system is provided that includes a single-instruction multiple-data (SIMD) processor, a memory component coupled to the SIMD processor, the memory component configured to store features extracted from an image, a plurality of decision trees stored in the memory component, in which each decision tree includes a plurality of nodes, a threshold value for each node, and a plurality of leaves, each leaf including a partial score, and a decision tree based adaptive boosting (AdaBoost) classifier trained for object classification stored in the memory component, the AdaBoost classifier executable on the SIMD processor, in which the AdaBoost classifier uses the plurality of decision trees for object classification, the AdaBoost classifier configured to evaluate N consecutive window positions concurrently using the features and vector instructions of the SIMD processor, in which the AdaBoost classifier concurrently traverses decision trees for the N consecutive window positions until classification is complete for the N consecutive window positions and in which N is a vector width of the SIMD processor divided by a bit size of a feature.

In one aspect, a non-transitory computer readable medium storing software instructions is provided, the software instruction, when executed on a single-instruction multiple-data (SIMD) processor, cause a method for object classification in a decision tree based adaptive boosting (AdaBoost) classifier to be executed. The method includes receiving feature vectors extracted from N consecutive window positions in an image in a memory coupled to the SIMD processor, in which N is a vector width of the SIMD processor divided by a bit size of a feature, and in which a feature vector includes N feature values, one feature value for each of the N consecutive window positions, and evaluating the N consecutive window positions concurrently by the AdaBoost classifier using the feature vectors and vector instructions of the SIMD processor, in which the AdaBoost classifier concurrently traverses decision trees for the N consecutive window positions until classification is complete for the N consecutive window positions, in which a decision tree includes a plurality of nodes, a threshold value for each node, and a plurality of leaves, each leaf including a partial score.

BRIEF DESCRIPTION OF THE DRAWINGS

Particular embodiments will now be described, by way of example only, and with reference to the accompanying drawings:

FIGS. 8-18 are examples;

FIG. 19 is a simplified block diagram of an example digital system configured to execute an embodiment of the method of FIG. 7.

DETAILED DESCRIPTION OF EMBODIMENTS OF THE DISCLOSURE

Figure 1:
FIG. 1 is an example illustrating the sliding window approach for pedestrian detection in the scene of an image.

Specific embodiments of the disclosure will now be described in detail with reference to the accompanying figures. Like elements in the various figures are denoted by like reference numerals for consistency.

As previously mentioned, an AdaBoost classifier may be constructed as a linear combination of weak classifiers such as decision trees. Embodiments of the disclosure are directed to decision tree based AdaBoost classifiers. In particular, embodiments are directed to implementing decision tree based AdaBoost classification on wide single-instruction multiple-data (SIMD) processors, also known as vector processors. Vector processors implement instructions that process multiple data points, i.e., vectors of data points, simultaneously. More specifically, multiple data points can be packed into one data word and a vector instruction can perform an operation on each data point simultaneously. For example, in a 128-bit vector processor, eight 16 bit pixels of an image can be packed into one 128-bit word and the eight pixels can be processed simultaneously.

For ease of explanation, embodiments of the disclosure are described herein using an example AdaBoost classifier trained to detect objects, e.g., pedestrians, in an image. A sliding window approach is used to detect pedestrians in an image. FIG. 1 is an example illustrating the sliding window approach for pedestrian detection in the scene of an image. In general, in this well-known approach, a window, also referred to as a box or an object model or an object patch, is moved through the image at overlapping horizontal and vertical positions and features computed based on the pixel values in the window at each position are analyzed by the classifier. The size of the window is based on the expected size of a pedestrian and is assumed to be 36×68. A window is examined at every fourth pixel vertically and horizontally. To identify different sizes of pedestrians, i.e., pedestrians at differing distances in a scene, the pedestrian detection is performed on multiple different scales of the image.

The classification is performed based on features computed for an image at multiple different scales. For object detection, features may include, for example, gradient magnitude, gradient orientation, block sums, intensity, color information, etc. The construction of such a classifier is well-known and is not described in detail herein. Further, computation of features for an image at multiple scales is well-known and is not described in detail herein. The example assumes the use of ten features computed using a cell size of 8×8: the components of the color space, i.e., Y (luma component), Cb (blue difference chroma component) and Cr (red difference chroma component), the gradient magnitude, and a histogram of gradients (HOG) for six bins between 0-180 degrees. Thus, assuming a window size of 36×38, there are 8*16*10=1280 features per window. Further, there is one window for each 4×4 block in each scale of an image.

Figure 2:
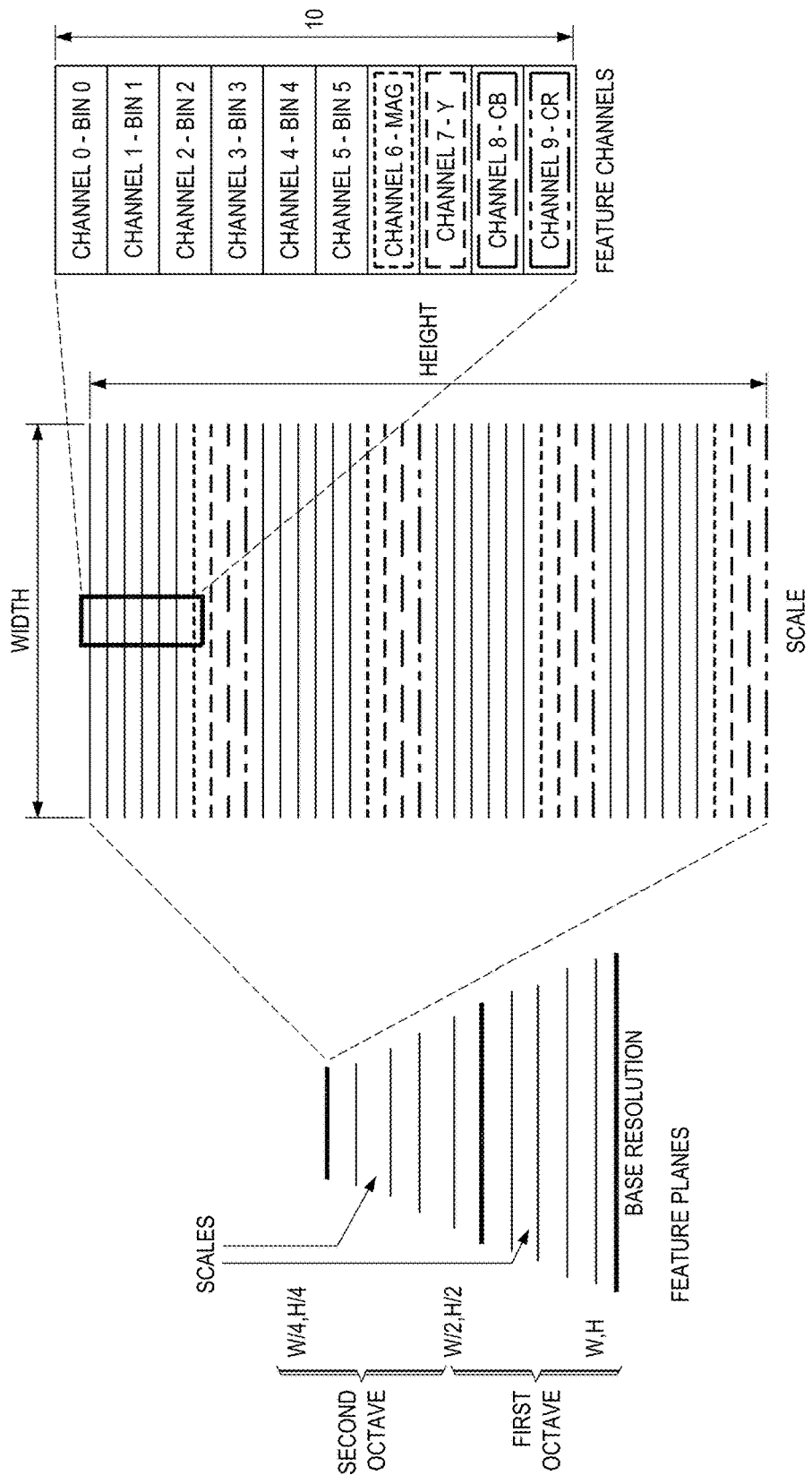
FIG. 2 is an example illustrating the feature extraction for an image and the arrangement of the resulting features in memory for object detection.

FIG. 2 is an example illustrating the feature extraction for an image and the arrangement of the resulting features in memory for object detection. As previously mentioned, features for pedestrian detection are computed for the original image (base resolution) and for multiple scales of the image. A sliding window approach as previously described is used to compute the features, resulting in set of ten feature channels for each window for each scale. A feature channel contains the computed values of a particular type of feature for a window. For this example, feature channels 0-5 are the bins of the HOG, channel 6 is the gradient magnitudes, and channels 7-9 are the respective color components.

Note that the feature channels of two sequential windows in a row of the image overlap in all but one position. For example, consider a window A at position x,y and the subsequent window B at position x+4, y. Each feature channel of window B is offset by one from the corresponding feature channel of window A. For example, if feature channel 0 of window A contains eight values, v1, v2, . . . , v8, then feature channel 0 of window B contains eight values v2, . . . , v8, v9. Similarly, feature channel 0 of window C at position x+8, y contains 8 values v3, . . . , v8, v9, v10.

The feature data for each scale of the image is arranged in memory as shown in FIG. 2. For every fourth row of the image beginning with row 0, ten rows of feature data corresponding to the ten feature channels are "stacked up" in memory such that contiguous values in a row of feature data corresponding to a row of a scale can be loaded by a vector load instruction. Thus, ten rows of feature data for row 0 of a scale are stored, followed by ten rows of feature data for row 4, followed by ten rows of feature data for row 8, etc.

Figure 3:
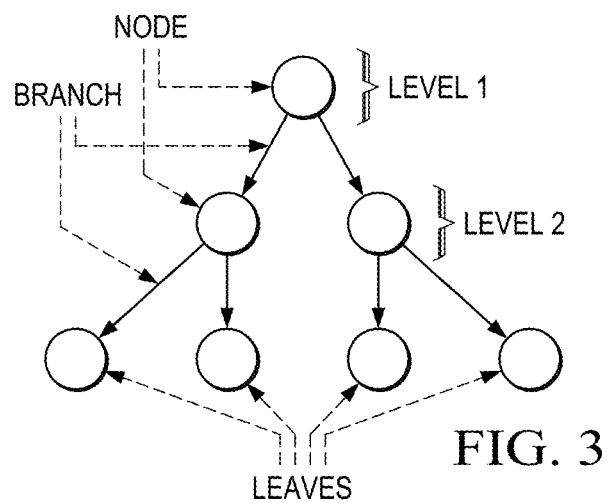
FIG. 3 is an example binary decision tree for an AdaBoost classifier.

The classifier is made up of 1280 binary two-level decision trees, each tree evaluating a feature at each node. A binary decision tree includes nodes and leaves with a binary split at each node as shown in the example of FIG. 3. The nodes are decision points in the tree and the leaves hold partial scores. A collective decision is formed based on partial scores resulting from traversals of multiple decision trees in a window. At each node, a feature value is compared against a threshold. The result of the comparison determines whether the left branch or the right branch out of a node is selected. The feature value input to the decision tree at each node will result in the selection of one of the four leaves.

Figure 4:
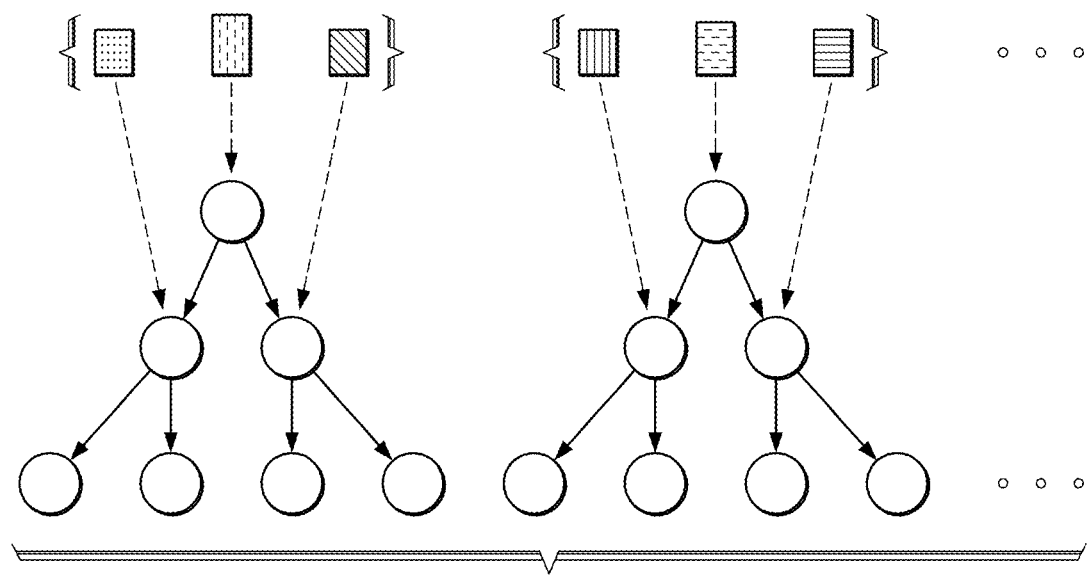
FIG. 4 is an example illustrating the general concept of a feature tuple in an AdaBoost classifier.

FIG. 4 is an example illustrating the general concept of a feature tuple. A feature tuple is a set of features mapped to a decision tree in the classifier. This mapping is formed during the training of the AdaBoost classifier. More specifically, the location in a window of each feature in a tuple is established. Different decision trees may have different tuples as inputs. The number of features in a tuple is equal to the number of nodes in a decision tree.

Figure 5:
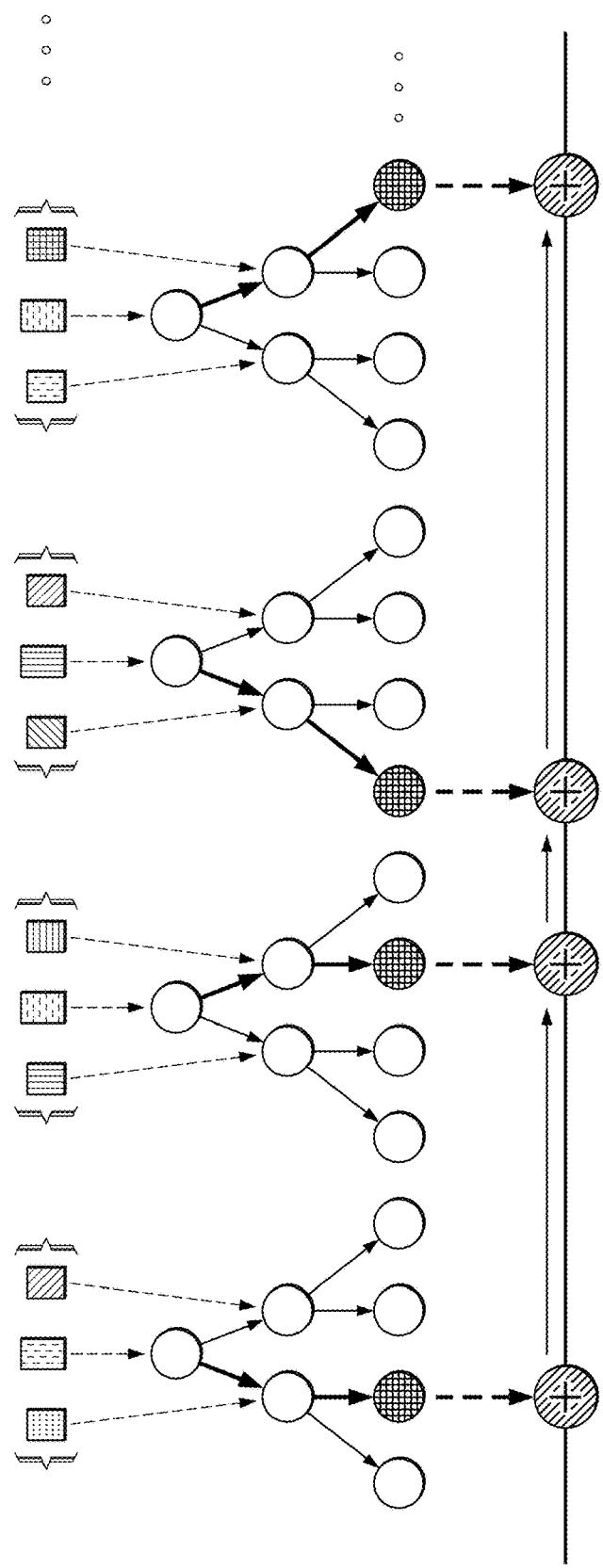
FIG. 5 is an example illustrating the general concept of partial scores in the leaves of each decision tree of an AdaBoost classifier.

FIG. 5 is an example illustrating the general concept of partial scores in the leaves of each decision tree. When a feature tuple is traversed through its respective decision tree, one of the leaves is selected, which contains a partial score for the particular feature tuple. The partial scores are summed and compared to a threshold, also referred to as a minima, exit threshold, or soft cascade threshold. If the minima is observed, the classification process may be terminated (exited) at that point or traversal of the remaining trees may continue to observe additional local minima, if any. The decision regarding exiting at any minima may be application specific. In the example classifier, tree traversal in a given window is terminated when the threshold is crossed during evaluation of the window.

As previously mentioned, the particular features included in each feature tuple and the mapping of the tuples to decision trees is decided during the training of the AdaBoost classifier. For each node in each tree, the location in a window of the feature to be considered at that node is determined during training. In addition, as previously mentioned, the memory storage offsets of corresponding features between two sequential object patches is one. Thus, vectors of features for each feature tuple are available in memory. These feature vectors can be exploited in a vector processor to perform classification on multiple object patches concurrently. As is explained in more detail in reference to the method of FIG. 7, N candidate object patches can be evaluated concurrently, where N is the vector width divided by the feature size. For example, if the vector width is 512 and the feature size is 16 bits, then N=32.

Figure 6:
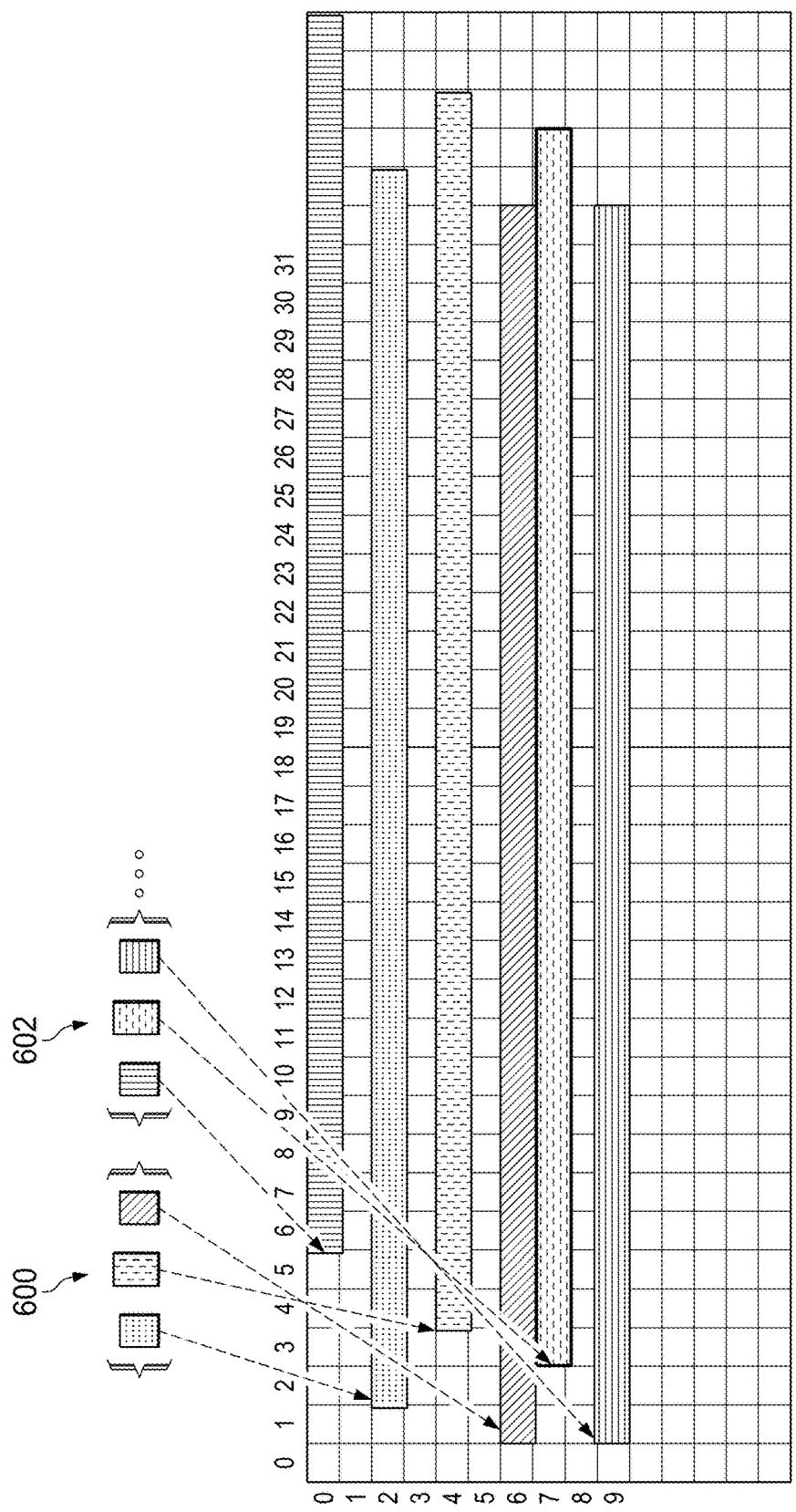
FIG. 6 is an example illustrating feature vectors.

FIG. 6 is an example illustrating feature vectors assuming 32 sequential candidate object patches. In this example, the first ten rows (labeled 0-9) correspond respectively to the previously described ten feature channels. Note that for both decision tree 600 and decision tree 602, the feature values for each node for each object patch are contiguous in memory, thus enabling a vector load of the 32 values for each node.

Figure 7:
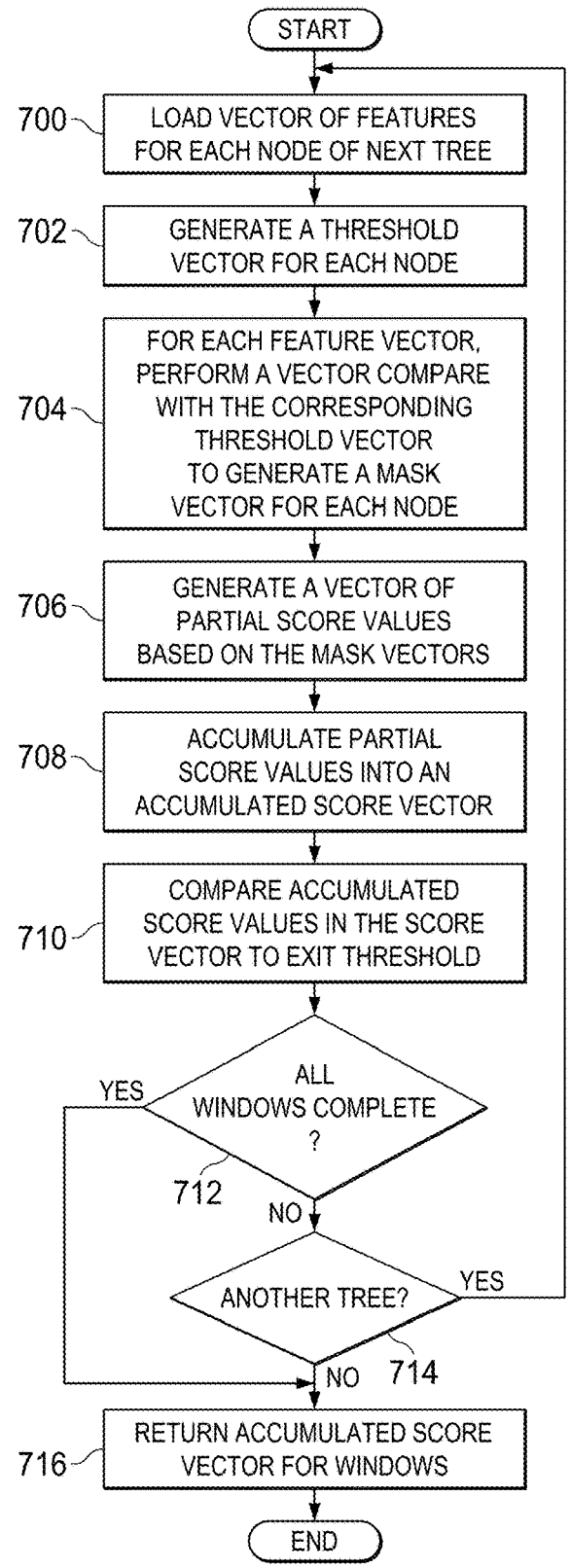
FIG. 7 is a flow diagram of a method for executing an AdaBoost classifier on a single-instruction multiple-data (SIMD) processor.

FIG. 7 is a flow diagram of a method for executing a decision tree based AdaBoost classifier on a SIMD processor. In particular, the method evaluates N consecutive windows (object patches) concurrently, where N is the SIMD processor vector width divided by the feature size. For purposes of explanation, the feature size is assumed to be 16 bits and N is assumed to be 32. Further, the classifier is assumed to be trained for pedestrian classification. For clarity of explanation, the method is described in reference to examples in FIGS. 8-18.

Figure 8:
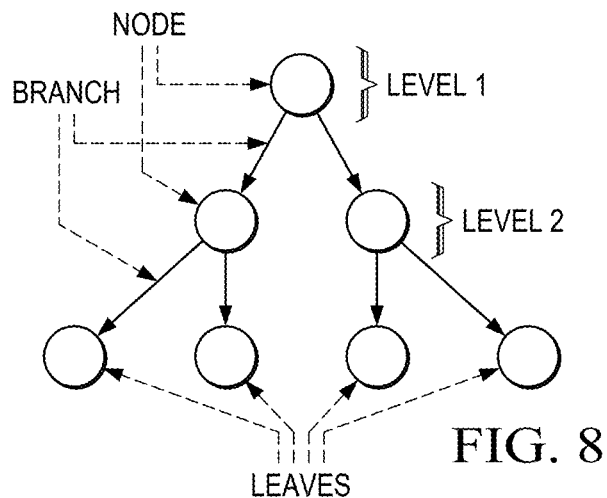
Figure 9:
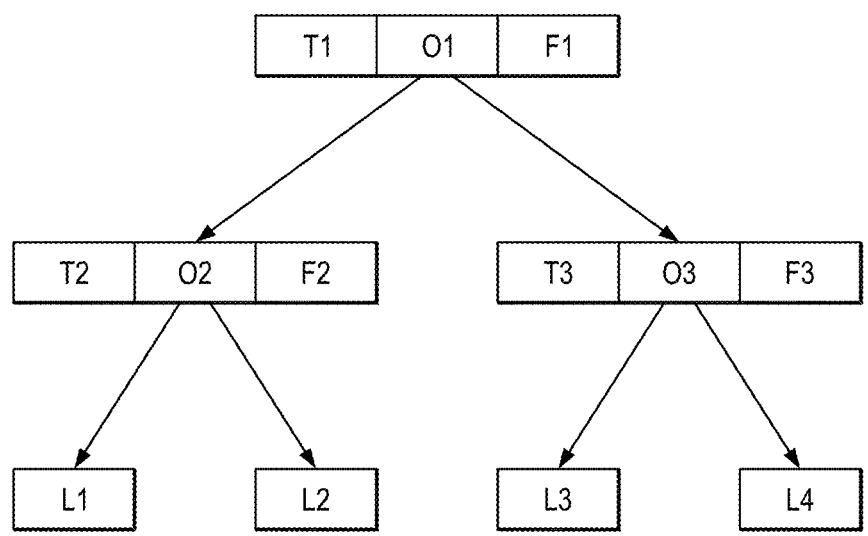

The AdaBoost classifier is assumed to be constructed as a linear combination of two level binary decision trees. As previously described in reference to FIG. 3, and as shown in the example of FIG. 8, a two level binary decision tree has three nodes and four leaves. As shown in the example of FIG. 9, each node logically includes a threshold value T, offset value O, and a feature F. The value of a feature F is fetched from memory at an offset O to be compared against the threshold T. The threshold value, offset, and particular feature for each node of each tree are identified when the classifier is trained, as are the leaf values L for each tree. In some embodiments, the tree parameters, i.e., the threshold values, the offsets, and the leaf values, of each tree of the AdaBoost classifier are stored linearly in memory as illustrated in FIG. 10. The extraction of features of an image that the AdaBoost classifier is to evaluate for the presence of pedestrians and how these features are stored in memory is previously described herein.

Figure 11:
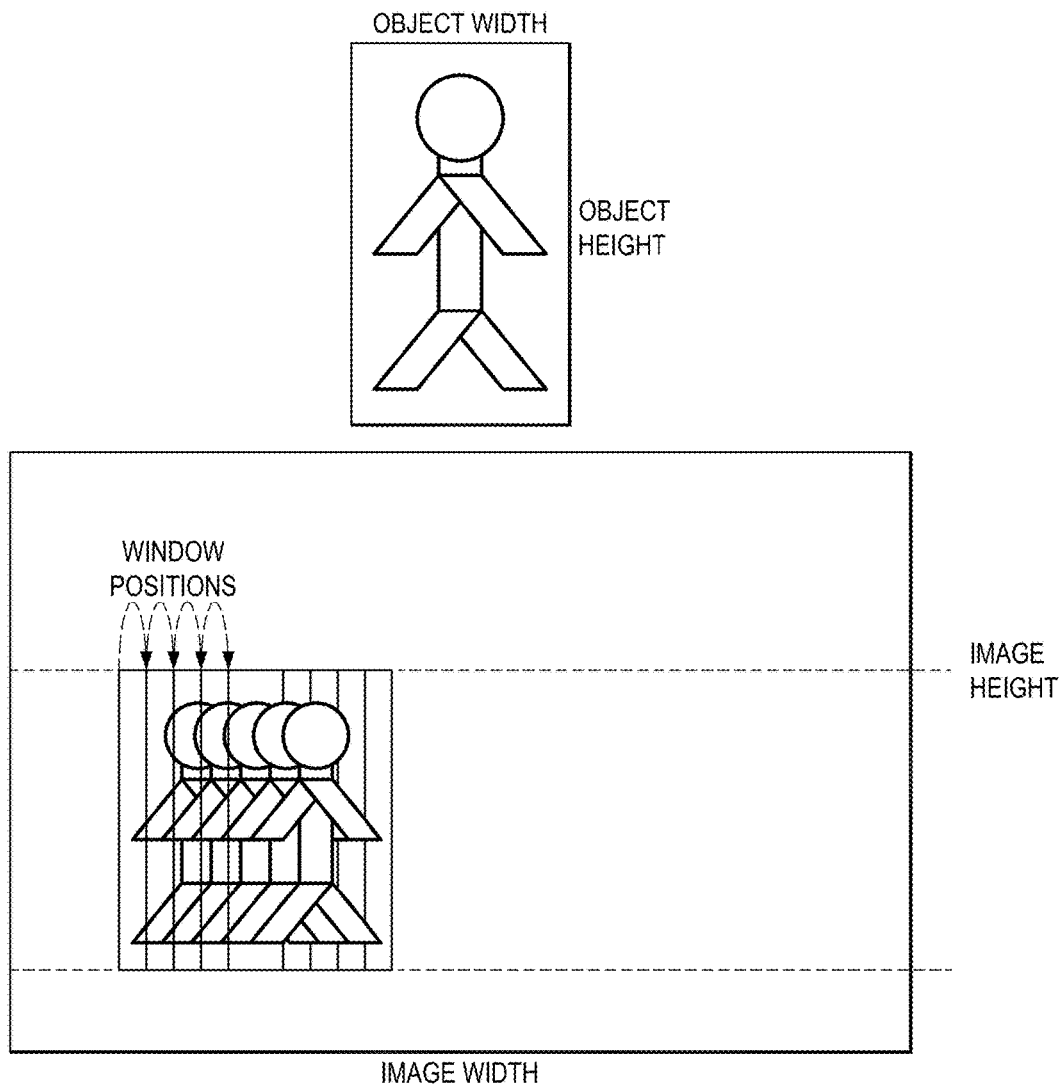

Referring to the example of FIG. 11, an image is searched for pedestrians using a sliding window approach in which the window size is based on the expected size of a pedestrian. The window positions searched are at an offset of one both vertically and horizontally. Further, the window positions are searched in raster scan order.

Figure 12:
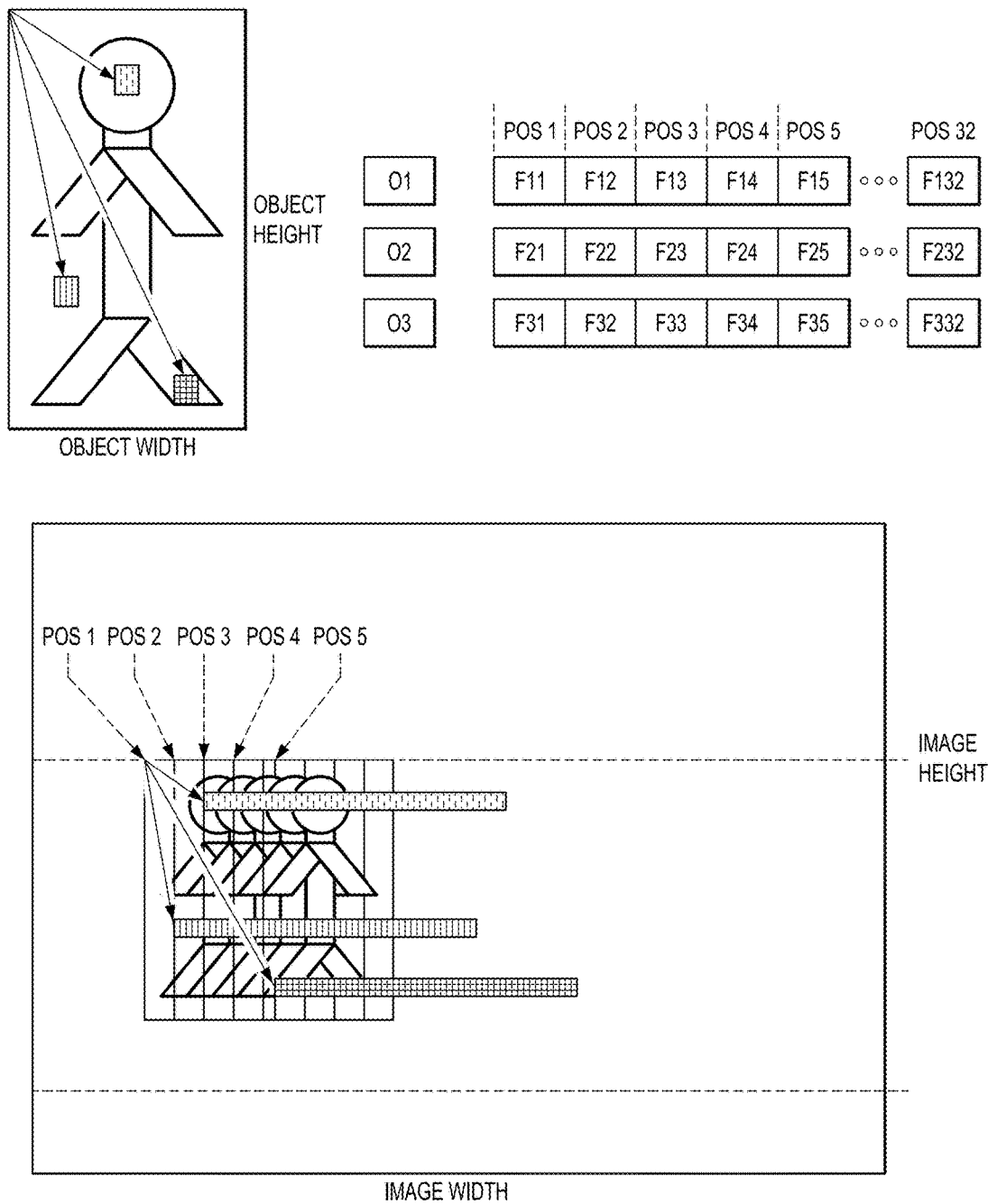

Referring again to the method of FIG. 7, to search 32 consecutive window positions, a vector of features is loaded 600 for each node of the first decision tree of the classifier. That is, three vectors of features are loaded, one for each node of the tree. The memory address of the vector for each feature is determined by the offset O for the feature in the tree. Due of the way the features are striped in memory, the offset of one between window positions, and the vector load capability of the SIMD processor, features for the 32 consecutive window positions are automatically loaded. FIG. 12 is an example illustrating this step.

A threshold vector is then generated 702 for each node of the tree, i.e., three threshold vectors are generated. The threshold vector for a node is generated by replicating the threshold value for the node 32 times. Replication in a SIMD processor is an operation of reading one scalar value from memory and populating all elements of a vector with this scalar value.

Vector compares are then performed 704 between each of the loaded feature vectors and the respective corresponding threshold vectors to generate three mask vectors each of which indicates the result of a respective comparison. Each mask vector contains an indication of whether or not the comparison was true for each feature value. FIG. 13 is an example illustrating the threshold vectors and the comparison. The naming convention used in this and other figures is: F<node> <position>, where node is the node number of the tree and position is the relative window position, e.g., F23 is the feature evaluated at node 2 of the tree for window position 3. FIG. 14 is an example illustrating the mask vectors resulting from the vector compare operations. In this example, the mask value corresponding to the comparison of each feature to the corresponding threshold is 0x0000 if the comparison is false and 0xFFFF if the comparison is true. One ordinary skill in the art will understand embodiments in which other mask values are used to indicate the results of the compare operations.

Figures 16, 19:
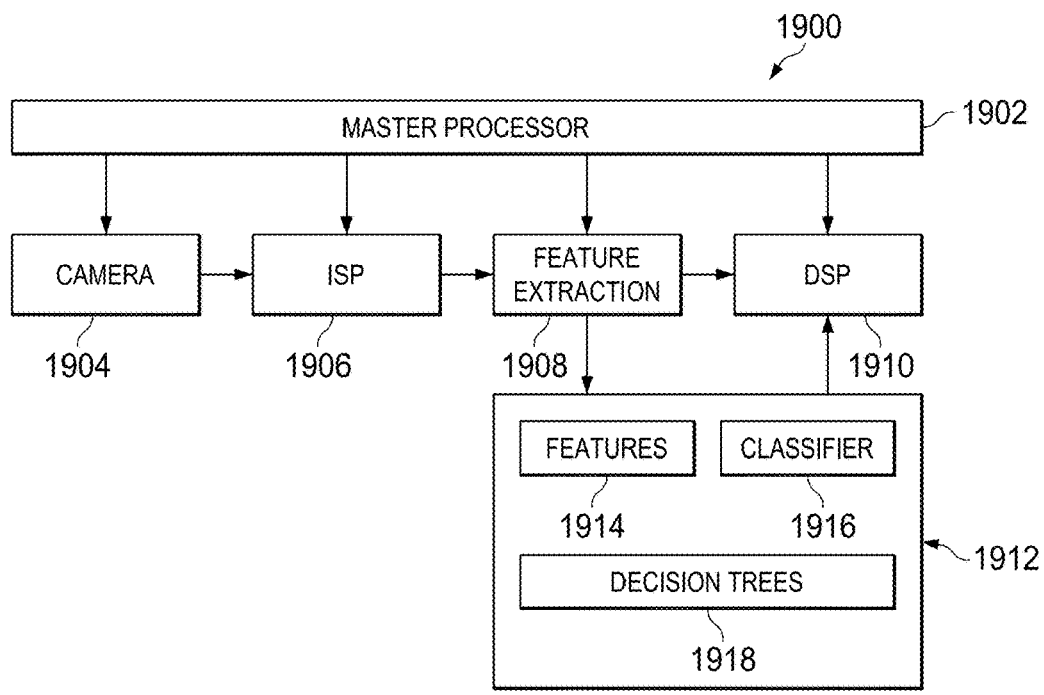
Figure 17:
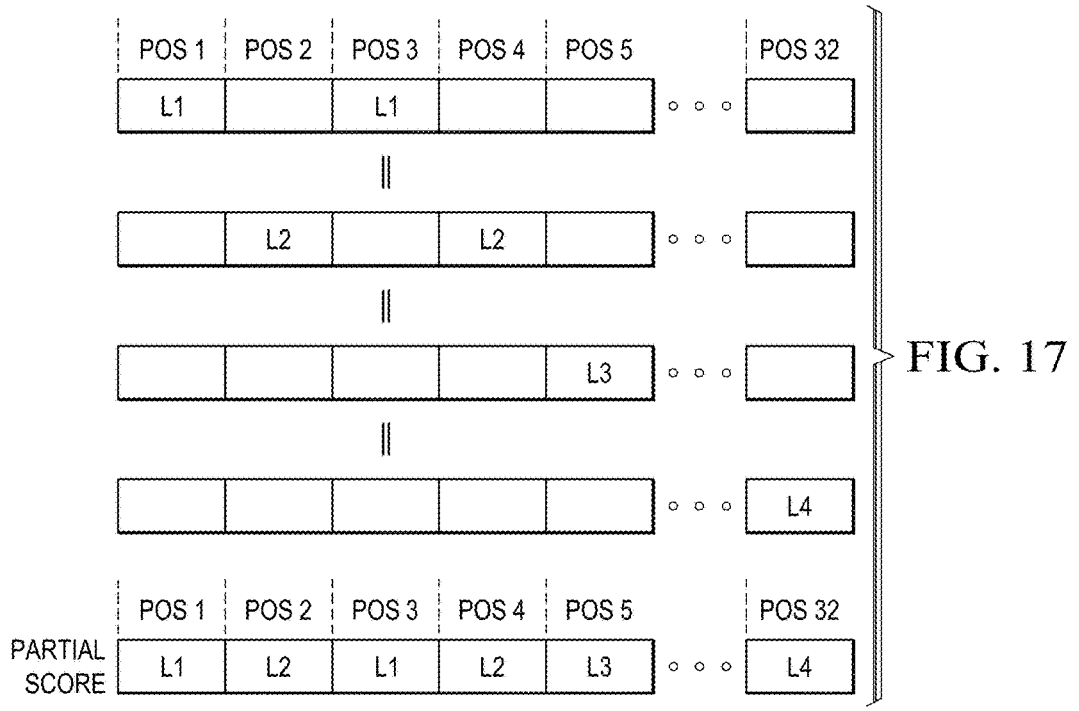

The three mask vectors are then used to select a partial score value, i.e., leaf value, for the tree traversal for each of the 32 object patches and to generate 706 a vector of partial scores in which each entry is the resulting partial score (leaf value) from the tree traversal for a corresponding object patch. In some embodiments, the generation of the vector of partial score values is performed as illustrated in the examples of FIGS. 15-17. As shown in FIG. 15, the three mask vectors M1, M2, and M3, are used to generate four leaf selection mask vectors K1, K2, K3, K4, one for each of the four leaf values of the tree. These leaf selection mask vectors are then used to select leaf values from four leaf vectors, LV1, LV2, LV3, LV4. The leaf vectors for the leaves of the tree, which are shown in FIG. 16, are generated by replicating each leaf value L1, L2, L3, and L4 in the corresponding vector 32 times.

The mask vectors M1, M2, M3 are logically combined as illustrated in FIG. 15 to generate the leaf selection mask vectors K1, K2, K3, K4. The logic is as follows: 1) when corresponding locations in M1 and M2 are true, then set the corresponding location in leaf selection mask vector K1 to select the corresponding location in leaf vector LV1; 2) when a location in M1 is true and the corresponding location in M2 is false, then set the corresponding location in leaf selection mask vector K2 to select the corresponding location in leaf vector LV2; 3) when a location in M1 is false and the corresponding location in M3 is false, then set the corresponding location in leaf selection mask vector K3 to select the corresponding location in leaf vector LV3; and 4) when corresponding locations in M1 and M3 are false, then set the corresponding location in leaf selection mask vector K4 to select the corresponding location in leaf vector LV4. Any locations in the leaf selection mask vectors not set to select a leaf value by the logical mask combinations are set to not select a leaf value. For this example, a selection value in a leaf selection mask vector is 0x0000 if the corresponding leaf value in the corresponding leaf vector is not to be selected and to 0xFFFF if the corresponding leaf value is to be selected. One ordinary skill in the art will understand embodiments in which other mask values are used. Note that a leaf selection mask vector is a logical combination of the mask vectors for the nodes in the traversal path of the decision tree that reaches the corresponding leaf.

The resulting leaf selection mask vectors K1, K2, K3, K4 are illustrated in FIG. 16. A logical and operation is performed between each leaf vector and the corresponding leaf selection mask vector to select leaf values (partial scores) from each leaf vector. The result of these four logical and operations is four vectors of leaf values as illustrated in FIG. 17. The four vectors are combined with logical or operations to generate the partial score vector in which each entry is the result of evaluating the decision tree for corresponding ones of the 32 window positions.

Referring again to FIG. 7, the partial score vector is accumulated 708 into an accumulated score vector having one entry for each of the 32 windows. For example, the partial score vector may be added to the accumulated score vector, which stores the sum of any previous partial scores from previous tree traversals. As is explained in more detail below, in some embodiments, an exit mask vector may be applied to the partial score vector prior to accumulating the partial scores to mask out partial scores for window positions that have met the criteria to terminate classification.

The accumulated score vector is compared 710 to an exit threshold vector and any accumulated partial score values below the exit threshold are saved as final scores. If an accumulated partial score value for a given window position is below the exit threshold, then tree evaluation, i.e., classification, for that window is complete. If the classification process for all 32 windows is complete 712, i.e., all accumulated scores are below the exit threshold, or all trees have been traversed 714, then the classification process for the 32 windows is terminated and the final accumulated score vector is returned 716. Otherwise, the classification continues 700 with the next tree in the classifier. The order in which the trees are traversed is determined during the training process.

Figure 18:
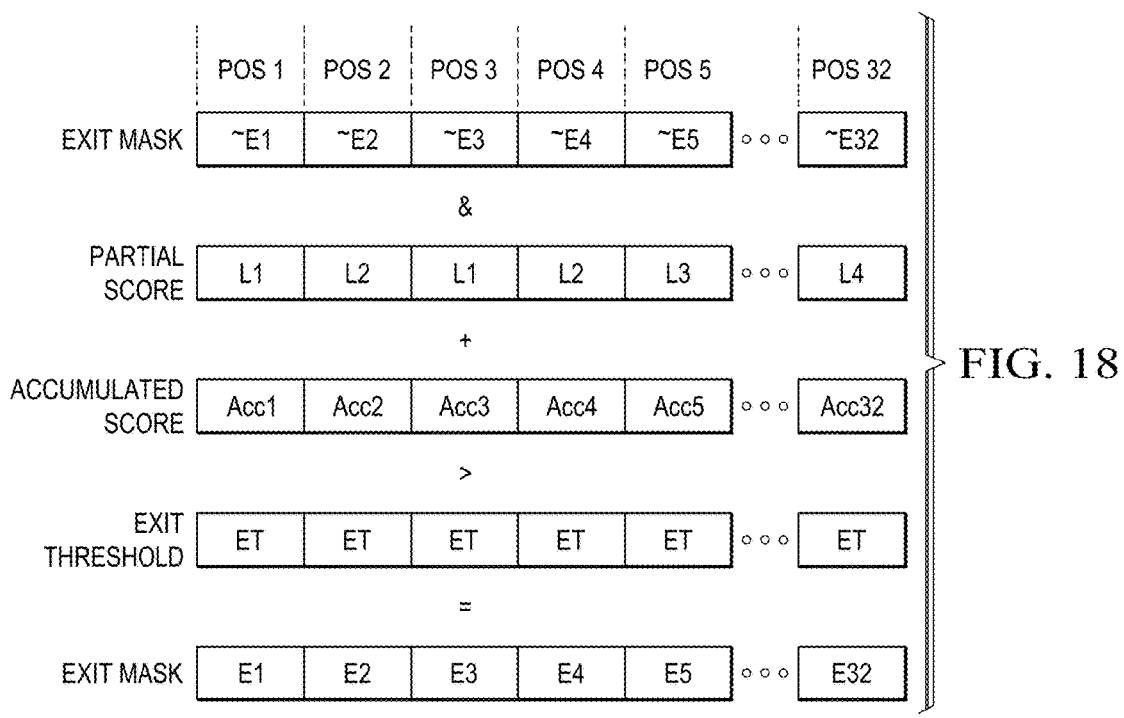

In some embodiments, because classification may not be complete for all of the 32 window positions, an exit mask vector is maintained that indicates which of the window positions has completed the classification process and which have not. The generation and use of the exit mask vector is illustrated in the example of FIG. 18. The vector comparison operation of the accumulated score vector to the exit threshold vector results in an exit mask vector that indicates which of the accumulated scores meets the exit criteria and which do not. For the next iteration of classification, a logical and operation of the inverse of the exit mask vector ("~" is bit invert) and the partial score vector is performed to mask out partial scores for any window positions that have previously exited. The resulting partial score vector is then added to the accumulated score vector, the comparison to the exit threshold vector is performed, and an updated exit mask is generated.

FIG. 19 is a simplified block diagram of an example digital system 1900 configured to execute an embodiment of the method of FIG. 7. In some embodiments, the digital system may be an integrated circuit, i.e., a system-on-a-chip. For simplicity of explanation, pedestrian classification as used in the description of other figures is assumed. The digital system 1900 includes a master processor 1902, a camera 1904, an image signal processor (ISP) 1906, a feature extraction component 1908, a SIMD instruction set digital signal processor (DSP) 1910, and a shared memory 1912. The master processor 1902 controls the operation of the other components to perform operations needed for pedestrian classification in scenes captured by the camera 1904. The master processor 1902 may be any suitable processor such as, for example, central processing units available from ARM Ltd.

The camera 1904 captures images of a scene and provides those images to the ISP 1906. The ISP 1906 performs image processing on each image to prepare the image for feature extraction. For example, the ISP 1906 may perform operations such as white balancing, black level adjustment, noise filtering, conversion from RGB to YCbCr, edge enhancement, etc. on the images.

The feature extraction component 1908 performs feature extraction on images from the ISP 1906. Feature extraction is previously described herein. The extracted features are stored in shared memory 1912 for use in the method.

The shared memory component 1912 may be on-chip memory, external memory, or a combination thereof. Any suitable memory design may be used. For example, the memory component 1912 may include static random access memory (SRAM), dynamic random access memory (DRAM), synchronous DRAM (SDRAM), read-only memory (ROM), flash memory, a combination thereof, or the like.

Further, the memory component 1912 stores software instructions for the AdaBoost classifier 1916 that include software instructions to perform an embodiment of the method of FIG. 6. The memory component also stores the features 1914 computed by the feature extraction component 1908, and the decision trees 1918 used by the classifier 1916. Some or all of the software instructions and decisions trees may be initially stored in a computer-readable medium such as a compact disc (CD), a diskette, a tape, a file, memory, or any other computer readable storage device and loaded and stored on the digital system 1900. In some cases, the software instructions may also be sold in a computer program product, which includes the computer-readable medium and packaging materials for the computer-readable medium. In some cases, the software instructions may be distributed to the digital system 1900 via removable computer readable media (e.g., floppy disk, optical disk, flash memory, USB key), via a transmission path from computer readable media on another computer system (e.g., a server), etc.

The DSP 1910 executes the software instructions of the classifier 1916 to perform pedestrian classification using the extracted features 1914. The DSP implements a SIMD instruction set providing at least vector load operations, vector compare operations, vector addition and subtraction operations, vector logical operations, and replication operations. Any suitable DSP with an appropriate SIMD instruction set may be used. One such DSP is described in reference to FIG. 20. The results of the classification are communicated to the master processor 1902 for further processing, such as pedestrian detection based on the classification results and decision making based on the results of the pedestrian detection.

Figure 20:
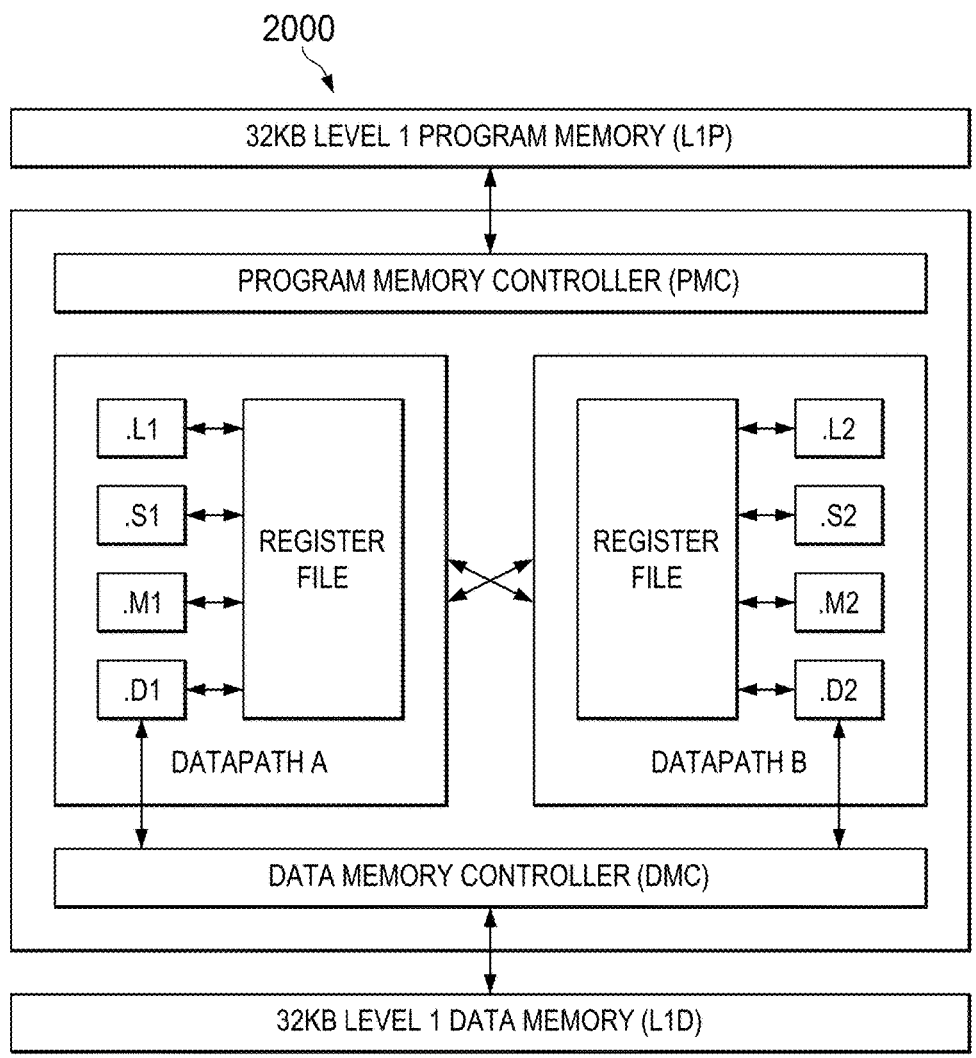
FIG. 20 is a block diagram of an example SIMD digital signal processor.

FIG. 20 is a high level block diagram of an example SIMD digital signal processor (DSP) 2000 suitable for executing one or more embodiments of the method of FIG. 7. The illustrated DSP is the TMS32C66x DSP available from Texas Instruments, Inc. The C66x DSP 2000 includes eight functional units, two register files, and two data paths. The two general-purpose register files each contain thirty-two 32-bit registers for a total of 64 registers. The general-purpose registers can be used for data or can be data address pointers. The data types supported include packed 8-bit data, packed 16-bit data, 32-bit data, 40-bit data, and 64-bit data. The C66x DSP 2000 supports up to 4 way SIMD operations for 16 bit data and up to 8 way SIMD operations for 8 bit data. Thus, the SIMD width for each data path is 64 bits, other than for some multiply operations which can handle up to 128 bits of packed data. A detailed description of the C66x and instruction set is provided in "TMS320C66x DSP CPU and Instruction Set Reference Guide," SPRUGH7, November 2010, which is incorporated by reference herein.

As previously mentioned, the method of FIG. 7 evaluates N windows (object patches) concurrently, where N is the SIMD width divided by the feature size. Thus, for the DSP 2000, if the feature size in a method embodiment is 8 bits, N=8, and if the feature size in a method embodiment is 16 bits, N=4.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described in which the decision trees are assumed to be two level binary decision trees. One of ordinary skill in the art will understand embodiments in which the decision trees include more than two levels and/or are not binary.

In another example, embodiments have been described in which the tree traversal for an object patch is terminated when the accumulated partial score for the object patch falls below an exit threshold. One of ordinary skill in the art will understand embodiments in which rather than terminating tree traversal for such an object patch, traversal of the remaining trees may be continued to observe additional local minima, if any.

In another example, embodiments have been described assuming that the classifier is performing pedestrian classification. One of ordinary skill in the art will understand embodiments for other types of object classification in an image, e.g., traffic signs, vehicles, cyclists, animals, etc.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method for object classification in a decision tree based adaptive boosting classifier, the method comprising:
retrieving, by a single-instruction multiple data (SIMD) processor from memory, feature vectors extracted from N consecutive window positions in an image stored in the memory, wherein N is a vector width of the SIMD processor divided by a bit size of a feature, and wherein a feature vector comprises N feature values, one feature value for each of the N consecutive window positions; and
evaluating, by the SIMD processor, the N consecutive window positions concurrently, using the feature vectors and vector instructions of the SIMD processor, wherein the SIMD processor concurrently traverses decision trees for the N consecutive window positions, wherein a decision tree comprises a plurality of nodes, a threshold value for each node, and a plurality of leaves, each leaf comprising a partial score.

2. The method of claim 1, wherein evaluating the N consecutive window positions comprises:
loading a plurality of the feature vectors using a vector load instruction of the SIMD processor, wherein one feature vector is loaded for each node of a single decision tree of the adaptive boosting classifier;
comparing each feature vector to a corresponding threshold vector using a vector compare instruction of the SIMD processor to generate a mask vector for each node, wherein the corresponding threshold vector comprises N copies of the threshold value for the node corresponding to the feature vector, and wherein the mask vector comprises N comparison results, one for each of the N features of the feature vector;
generating a partial score vector based on the mask vectors and the partial score values of the leaves of the decision tree, the partial score vector comprising N partial score values, one for each of the N consecutive window positions;
accumulating the N partial score values into an accumulated score vector, the accumulated score vector comprising N accumulated score values, one for each of the N consecutive window positions; and
comparing the accumulated score vector to an exit threshold vector using a vector compare instruction of the SIMD processor to determine whether or not object classification can be terminated for one or more of the N consecutive window positions.

3. The method of claim 2, wherein generating the partial score vector comprises:
generating a leaf selection mask vector for each of the leaves of the decision tree based on the mask vectors, wherein the leaf selection mask vector is a logical combination of mask vectors for nodes in a traversal path of the single decision tree that reaches the leaf corresponding to the leaf selection mask vector; and
performing a logical and operation of each leaf selection mask vector with a corresponding leaf vector to select partial score values for each of the N consecutive window positions from the leaf vectors, wherein a corresponding leaf vector comprises N copies of a partial score of the leaf.

4. The method of claim 1, wherein the decision trees are two-level binary decision trees.

5. The method of claim 1, wherein the adaptive boosting classifier is trained for pedestrian classification.

6. The method of claim 1, wherein the SIMD processor is a digital signal processor.

7. A digital system, comprising:
a single-instruction multiple-data (SIMD) processor;
a non-transitory computer readable storage medium coupled to the SIMD processor, the non-transitory computer readable storage medium storing:
features extracted from an image;
a plurality of decision trees, wherein each decision tree comprises a plurality of nodes, a threshold value for each node, and a plurality of leaves, each leaf comprising a partial score; and
a program for execution by the SIMD processor, the program including instructions for a decision tree based adaptive boosting classifier trained for object classification instructions to evaluate N consecutive window positions concurrently using the features and vector instructions of the SIMD processor, wherein the SIMD processor concurrently traverses decision trees for the N consecutive window positions, and wherein N is a vector width of the SIMD processor divided by a bit size of a feature.

8. The digital system of claim 7, wherein the instructions further comprise instructions to extract the features from the N consecutive window positions in the image.

9. The digital system of claim 8, comprising a camera coupled to the SIMD processor, the camera to provide the image.

10. The digital system of claim 7, wherein the instructions further comprise instructions to evaluate the N consecutive window positions by:
loading a plurality of feature vectors from the non-transitory computer readable storage medium using a vector load instruction of the SIMD processor, wherein one feature vector is loaded for each node of a single decision tree of the plurality of decision trees and wherein a feature vector comprises N feature values, one feature value for each of the N consecutive window positions;
comparing each feature vector to a corresponding threshold vector using a vector compare instruction of the SIMD processor, to generate a mask vector for each node, wherein the corresponding threshold vector comprises N copies of the threshold value for the node corresponding to the feature vector, and wherein the mask vector comprises N comparison results, one for each of the N features of the feature vector;
generating a partial score vector based on the mask vectors and the partial score values of the leaves of the decision tree, the partial score vector comprising N partial score values, one for each of the N consecutive window positions;
accumulating the partial score values into an accumulated score vector, the accumulated score vector comprising N accumulated score values, one for each of the N consecutive window positions; and
comparing the accumulated score vector to an exit threshold vector using a vector compare instruction of the SIMD processor, to determine whether or not object classification termination for one or more of the N consecutive window positions.

11. The digital system of claim 10, wherein generating the partial score vector comprises:
generating a leaf selection mask vector for each of the leaves of the decision tree based on the mask vectors, wherein the leaf selection mask vector is a logical combination of mask vectors for nodes in a traversal path of the single decision tree that reaches the leaf corresponding to the leaf selection mask vector; and
performing a logical and operation of each leaf selection mask vector with a corresponding leaf vector to select partial score values for each of the N window positions from the leaf vectors, wherein a corresponding leaf vector comprises N copies of a partial score of the leaf.

12. The digital system of claim 7, wherein the decision trees are two level binary decision trees.

13. The digital system of claim 7, wherein the adaptive boosting classifier is trained for pedestrian classification.

14. The digital system of claim 7, wherein the SIMD processor is a digital signal processor.

15. A non-transitory computer readable storage medium storing a program for execution by a single-instruction multiple-data (SIMD) processor, for object classification in a decision tree based adaptive boosting classifier, the program including instructions for:
retrieving, from the non-transitory computer readable storage medium, feature vectors extracted from N consecutive window positions in an image, wherein N is a vector width of the SIMD processor divided by a bit size of a feature, and wherein a feature vector comprises N feature values, one feature value for each of the N consecutive window positions; and
evaluating the N consecutive window positions concurrently, using the feature vectors and vector instructions of the SIMD processor, concurrently traversing decision trees for the N consecutive window positions, wherein a decision tree comprises a plurality of nodes, a threshold value for each node, and a plurality of leaves, each leaf comprising a partial score.

16. The non-transitory computer readable storage medium of claim 15, wherein the instructions for evaluating the N consecutive window positions comprise instructions for:
loading a plurality of the feature vectors using a vector load instruction of the SIMD processor, wherein one feature vector is loaded for each node of a single decision tree of the adaptive boosting classifier;
comparing each feature vector to a corresponding threshold vector using a vector compare instruction of the SIMD processor, to generate a mask vector for each node, wherein the corresponding threshold vector comprises N copies of the threshold value for the node corresponding to the feature vector, and wherein the mask vector comprises N comparison results, one for each of the N features of the feature vector;
generating a partial score vector based on the mask vectors and the partial score values of the leaves of the decision tree, the partial score vector comprising N partial score values, one for each of the N consecutive window positions;
accumulating the partial score values into an accumulated score vector, the accumulated score vector comprising N accumulated score values, one for each of the N consecutive window positions; and
comparing the accumulated score vector to an exit threshold vector using a vector compare instruction of the SIMD processor, to determine termination of object classification for one or more of the N consecutive window positions.

17. The non-transitory computer readable storage medium of claim 16, wherein the instructions for generating a partial score vector comprise instructions for:
generating a leaf selection mask vector for each of the leaves of the decision tree based on the mask vectors, wherein the leaf selection mask vector is a logical combination of mask vectors for nodes in a traversal path of the single decision tree that reaches the leaf corresponding to the leaf selection mask vector; and
performing a logical and operation of each leaf selection mask vector with a corresponding leaf vector, to select partial score values for each of the N window positions from the leaf vectors, wherein a corresponding leaf vector comprises N copies of a partial score of the leaf.

18. The non-transitory computer readable storage medium of claim 15, wherein the decision trees are two-level binary decision trees.

19. The non-transitory computer readable storage medium of claim 15, wherein the adaptive boosting classifier is trained for pedestrian classification.

20. The non-transitory computer readable storage medium of claim 15, wherein the SIMD processor is a digital signal processor.

* * * * *